University States Patent  
Yang et al.

(10) Patent No.: US 12,228,428 B2  
(45) Date of Patent: Feb. 18, 2025

(54) SENSING UNIT

(71) Applicant: Samsung Display Co., LTD., Yongin-si (KR)

(72) Inventors: Sung Jin Yang, Yongin-si (KR); Hyun Sik Park, Yongin-si (KR); Ma Eum Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/509,234

(22) Filed: Nov. 14, 2023

(65) Prior Publication Data

US 2024/0085218 A1 Mar. 14, 2024

Related U.S. Application Data

(62) Division of application No. 17/011,905, filed on Sep. 3, 2020, now Pat. No. 11,852,508.

(30) Foreign Application Priority Data

Mar. 10, 2020 (KR) .......................... 10-2020-0029816

(51) Int. Cl.
  *G06F 3/044* (2006.01)
  *G01D 5/165* (2006.01)
(52) U.S. Cl.
  CPC ......... *G01D 5/1655* (2013.01); *G06F 3/0446* (2019.05)
(58) Field of Classification Search
  CPC ......... G06F 3/0446; G06F 2203/04103; G06F 2203/04111; G06F 2203/04112; G06F 3/041
  See application file for complete search history.

(56) References Cited

U.S. PATENT DOCUMENTS

| | | | |
|---|---|---|---|
| 9,634,660 | B2 | 4/2017 | Trend et al. |
| 9,965,113 | B2 | 5/2018 | Ryu et al. |
| 10,025,421 | B2 | 7/2018 | Kim et al. |
| 10,394,401 | B2 | 8/2019 | Hammura |
| 10,739,929 | B2 | 8/2020 | Lee et al. |
| 2011/0057893 | A1 | 3/2011 | Kim et al. |

(Continued)

FOREIGN PATENT DOCUMENTS

| | | |
|---|---|---|
| CN | 106415462 A | 2/2017 |
| CN | 109324709 A | 2/2019 |

(Continued)

OTHER PUBLICATIONS

Non-Final Office Action dated on Jan. 13, 2023, issued in U.S. Appl. No. 17/011,905.

(Continued)

*Primary Examiner* — Amy Onyekaba  
(74) *Attorney, Agent, or Firm* — Lewis Roca Rothgerber Christie LLP

(57) ABSTRACT

A sensing unit including first sensing electrodes arranged in a sensing area, second sensing electrodes electrically isolated from the first sensing electrodes, first identification patterns adjacent to the first sensing electrodes, and second identification patterns adjacent to the second sensing electrodes, in which a number of the first identification patterns is different from a number of the second identification patterns.

10 Claims, 12 Drawing Sheets

(56) References Cited

U.S. PATENT DOCUMENTS

| | | | |
|---|---|---|---|
| 2013/0279063 A1* | 10/2013 | Yoo | H01H 11/00 |
| | | | 361/220 |
| 2014/0069796 A1* | 3/2014 | Kang | G06F 1/16 |
| | | | 200/600 |
| 2014/0152580 A1 | 6/2014 | Weaver et al. | |
| 2015/0085205 A1 | 3/2015 | Chen et al. | |
| 2015/0188538 A1* | 7/2015 | Huh | H03K 17/9622 |
| | | | 349/12 |
| 2016/0132153 A1 | 5/2016 | Lin et al. | |
| 2016/0313828 A1 | 10/2016 | Yoshiki | |
| 2017/0031490 A1 | 2/2017 | Hashida et al. | |
| 2017/0139512 A1 | 5/2017 | Kim et al. | |
| 2017/0269728 A1 | 9/2017 | Donnelly | |
| 2018/0059843 A1* | 3/2018 | Kim | G06F 3/0446 |
| 2019/0004638 A1* | 1/2019 | Lee | G06F 3/0412 |
| 2019/0050104 A1 | 2/2019 | Na et al. | |
| 2019/0056816 A1 | 2/2019 | Hsu | |
| 2019/0064960 A1 | 2/2019 | Na et al. | |
| 2019/0095010 A1 | 3/2019 | Han et al. | |
| 2019/0121466 A1 | 4/2019 | Sakaue | |
| 2019/0294274 A1 | 9/2019 | Cho et al. | |
| 2020/0285348 A1* | 9/2020 | Nakayama | G06F 3/047 |
| 2021/0165531 A1 | 6/2021 | Kim | |
| 2021/0210559 A1 | 7/2021 | Chen et al. | |

FOREIGN PATENT DOCUMENTS

| | | |
|---|---|---|
| CN | 109426306 A | 3/2019 |
| KR | 10-1082293 | 11/2011 |
| KR | 10-2016-0144450 | 12/2016 |
| KR | 10-1849149 | 4/2018 |
| KR | 10-2019-0002827 | 1/2019 |

OTHER PUBLICATIONS

Final Office Action dated on May 24, 2023, issued in U.S. Appl. No. 17/011,905.

Notice of Allowance dated on Sep. 12, 2023, issued in U.S. Appl. No. 17/011,905.

* cited by examiner

SENSING UNIT

CROSS-REFERENCE TO RELATED APPLICATIONS

This application is a Divisional of U.S. patent application Ser. No. 17/011,905, filed on Sep. 3, 2020, which claims priority from and the benefit of Korean Patent Application No. 10-2020-0029816, filed on Mar. 10, 2020, each of which is hereby incorporated by reference for all purposes as if fully set forth herein.

BACKGROUND

Field

The inventive concepts generally relate to a sensing unit.

Discussion of the Background

Electronic devices such as a smartphone, a tablet PC, a digital camera, a notebook computer, a navigation system, and a television (TV), which provide an image to a user, include a display device configured to display an image. The display device includes a display panel which generates and displays an image and various input devices.

A sensing unit is a kind of information input device, and may be provided and used in the display device. The sensing unit may be attached to one surface of the display panel or be integrally formed with the display panel. A user may input information by pressing or touching the sensing unit while viewing an image displayed on a screen. The sensing unit may include a first sensing electrode electrically connected in one direction and a second sensing electrode electrically connected in another direction intersecting the one direction.

The above information disclosed in this Background section is only for understanding of the background of the inventive concepts, and, therefore, it may contain information that does not constitute prior art.

SUMMARY

Embodiments provide a sensing unit capable of easily performing failure analysis.

Embodiments also provide a sensing unit capable of minimizing a potential short circuit point between sensing electrodes.

Additional features of the inventive concepts will be set forth in the description which follows, and in part will be apparent from the description, or may be learned by practice of the inventive concepts.

In accordance with an aspect of the inventive concepts, there is provided a sensing unit including: first sensing electrodes arranged along a first direction in a sensing area; and second sensing electrodes arranged along a second direction intersecting the first direction, wherein each of the first sensing electrodes includes a plurality of first mesh lines, and each of the second sensing electrodes includes a plurality of second mesh lines, wherein a line width of the first mesh lines is different from a line width of the second mesh lines.

The sensing unit may further include conductive patterns electrically isolated from the first sensing electrodes and the second sensing electrodes. Each of the conductive patterns may include a plurality of third mesh lines.

A line width of the third mesh lines may be different from the line width of the first mesh lines or the line width of the second mesh lines.

At least one of the first mesh lines, the second mesh lines, and the third mesh lines may include a protrusion pattern partially protruding from a side thereof.

Each of the first mesh lines may include a disconnection area in which the first mesh line is disconnected in the second direction.

Each of the first mesh lines may include a compensation pattern partially protruding from a side thereof.

The compensation pattern may be disposed in parallel to the second mesh lines.

The sensing unit may further include a connection electrode which electrically connects the first sensing electrodes adjacent to each other.

The connection electrode may not overlap with the disconnection area.

The connection electrode may be disposed at a point at which the first mesh lines and the second mesh lines intersect each other.

In accordance with another aspect of the inventive concepts, there is provided a sensing unit including: first sensing electrodes arranged in a sensing area; second sensing electrodes electrically isolated from the first sensing electrodes; first identification patterns adjacent to the first sensing electrodes; and second identification patterns adjacent to the second sensing electrodes, wherein a number of the first identification patterns is different from that of the second identification patterns.

The sensing unit may further include: a substrate; a first sensing conductive layer disposed on the substrate; and a sensing insulating layer disposed over the first sensing conductive layer. The first identification pattern or the second identification pattern may penetrate the sensing insulating layer.

Each of the first sensing electrodes may include a plurality of first mesh lines. The first identification pattern may be disposed at one side of the first mesh lines.

The sensing unit may further include a sensing protective layer disposed on the sensing insulating layer. The sensing protective layer may be in contact with the substrate through the first identification pattern or the second identification pattern.

Each of the first sensing electrodes may include a plurality of first mesh lines. The first identification pattern may overlap with the first mesh lines on a plane.

The sensing unit may further include a second sensing conductive layer disposed on the sensing insulating layer.

The second sensing conductive layer may be in contact with the first sensing conductive layer through the first identification pattern or the second identification pattern.

The sensing unit may further include: a first sensing conductive layer; a second sensing conductive layer above the first sensing conductive layer; and a sensing insulating layer disposed between the first sensing conductive layer and the second sensing conductive layer. The first sensing electrodes and the second sensing electrodes may be configured with the first sensing conductive layer. The first identification pattern and the second identification pattern may be configured with the second sensing conductive layer.

Each of the first sensing electrodes may include a plurality of first mesh lines. The first identification pattern may overlap with the first mesh lines.

A reflexibility of the second sensing conductive layer may be lower than a reflexibility of the first sensing conductive layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

Figure 1:
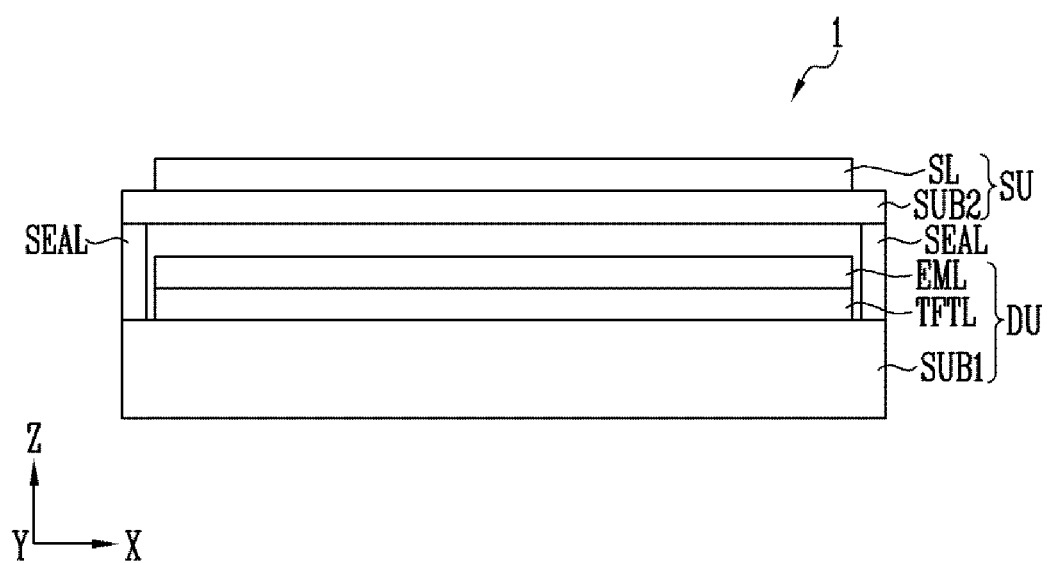

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 is a sectional view illustrating a display device in accordance with an embodiment of the inventive concepts.

Figure 2:
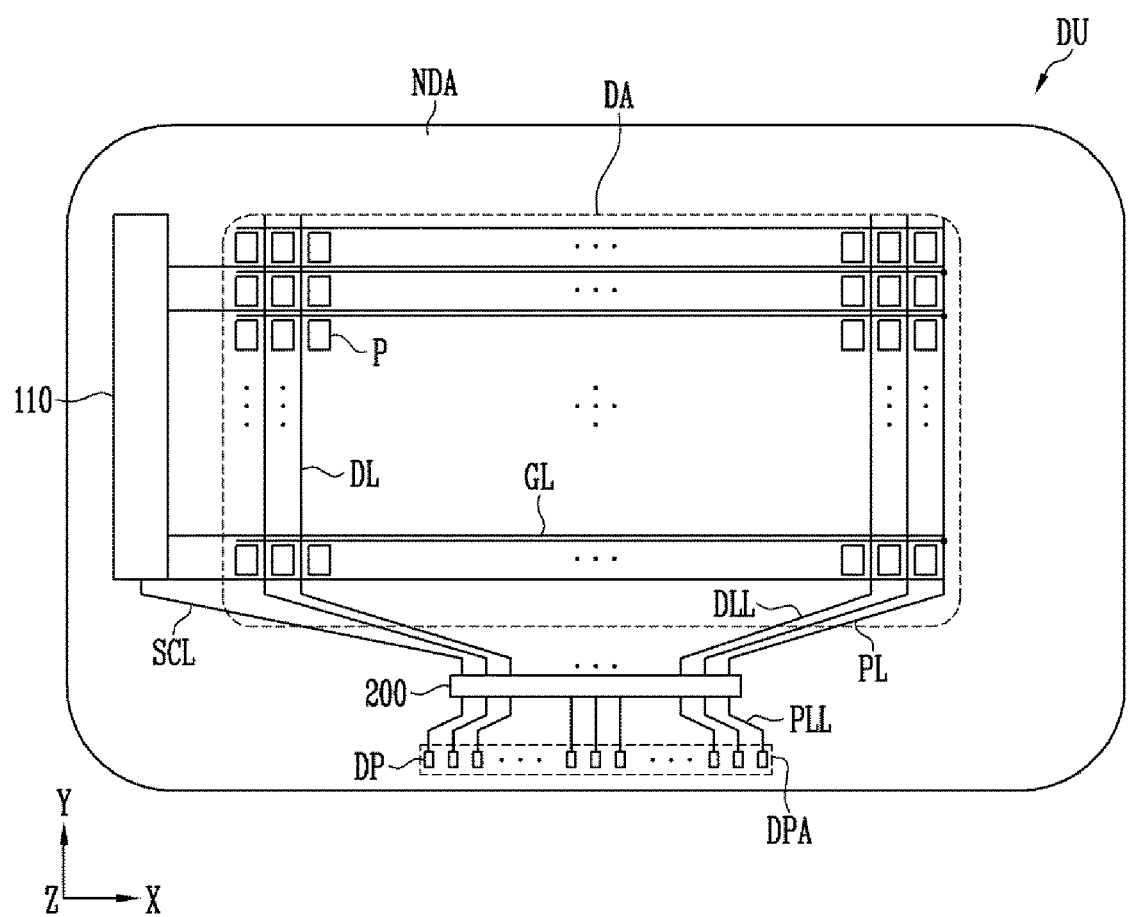

FIG. 2 is a plan view illustrating a display unit of in FIG. 1.

Figure 3:
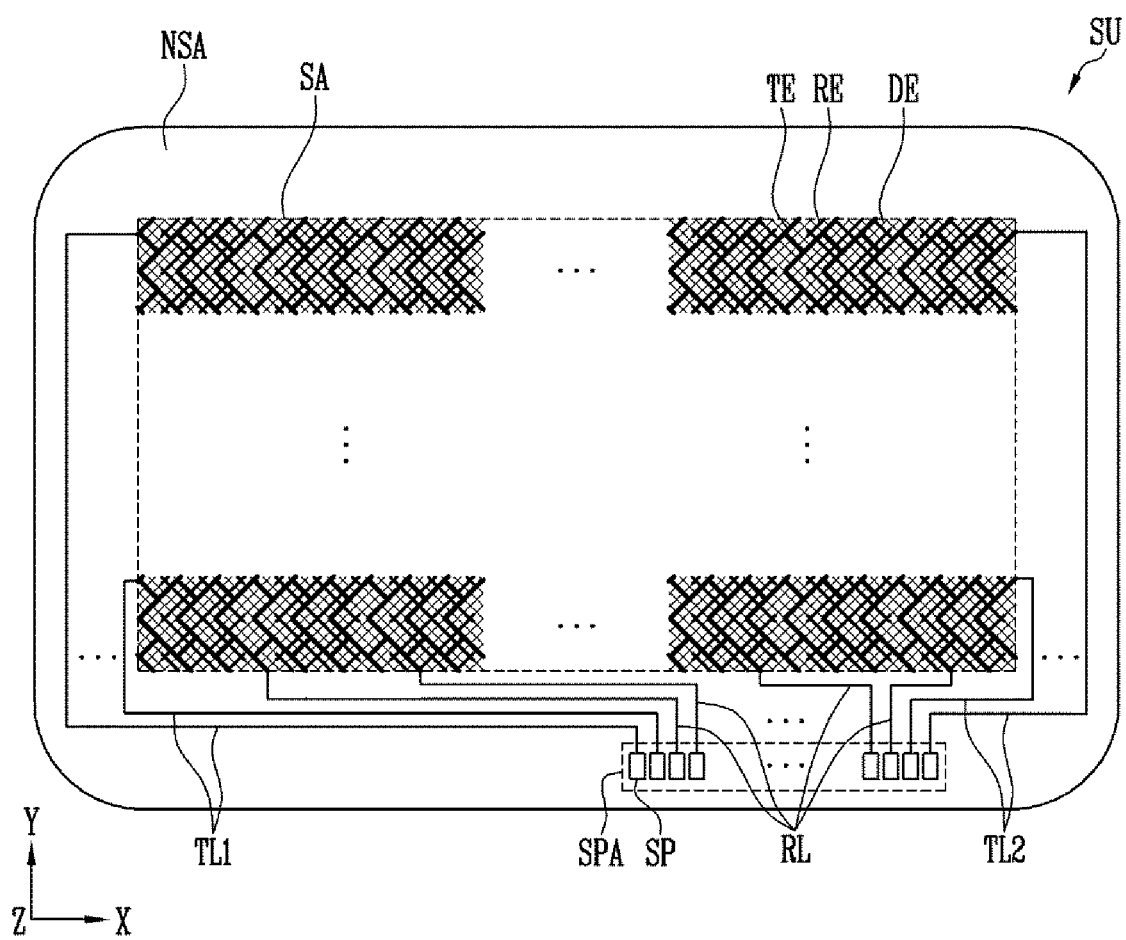

FIG. 3 is a plan view illustrating a sensing unit of in FIG. 1.

Figure 4:
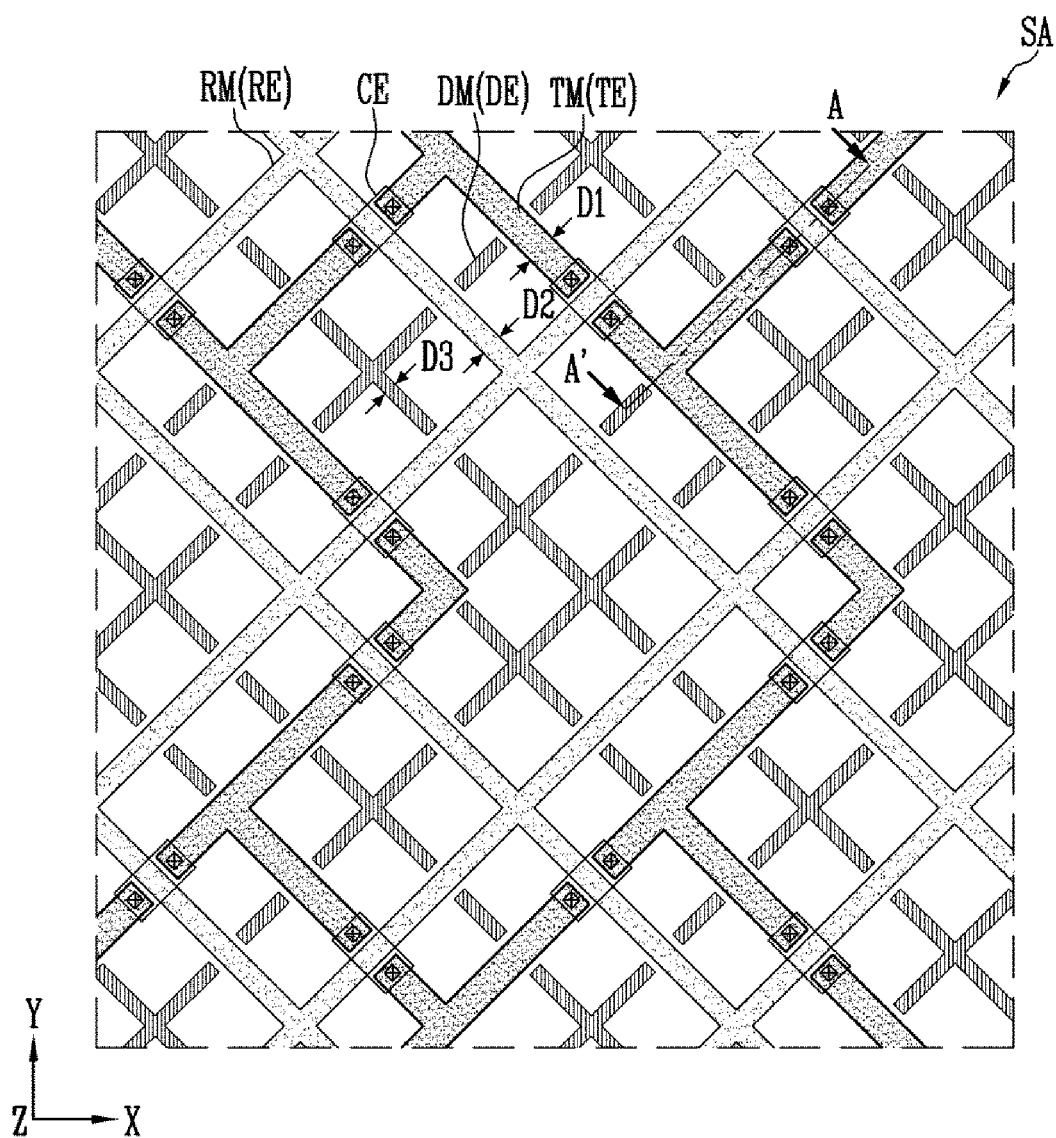

FIG. 4 is an enlarged view illustrating a sensing area of in FIG. 3.

Figure 5:
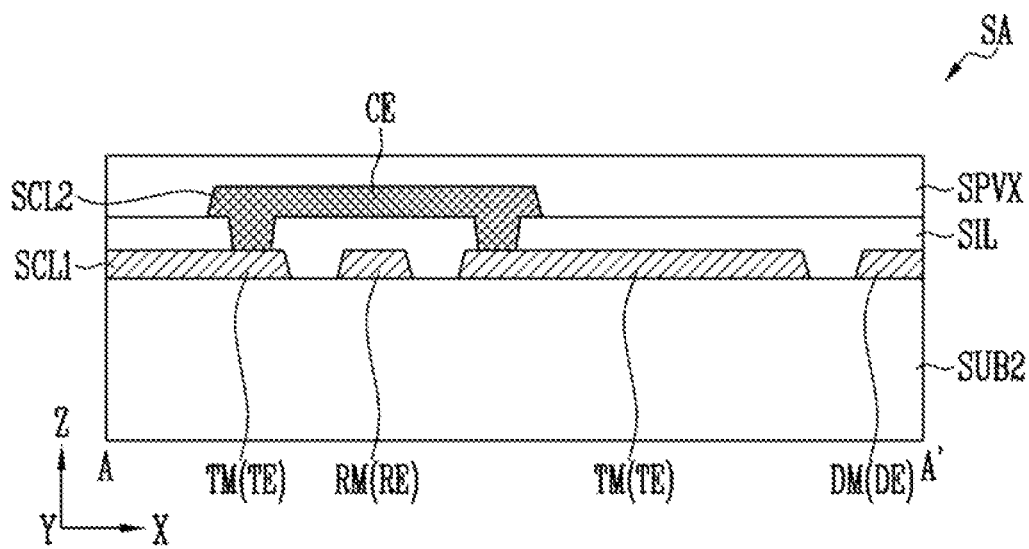
Figure 6:
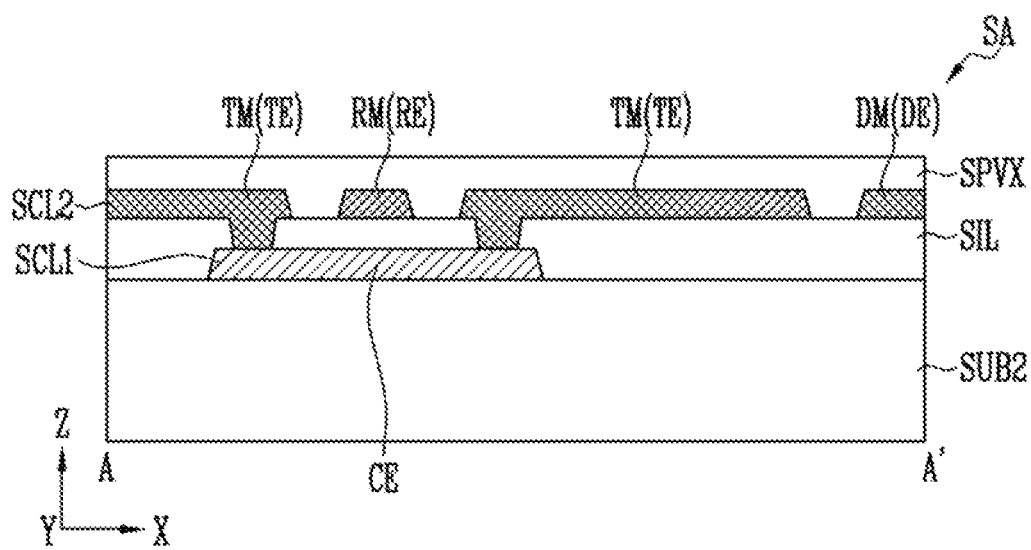

FIGS. 5 and 6 are sectional views taken along line A-A' illustrated in FIG. 4.

Figure 7:
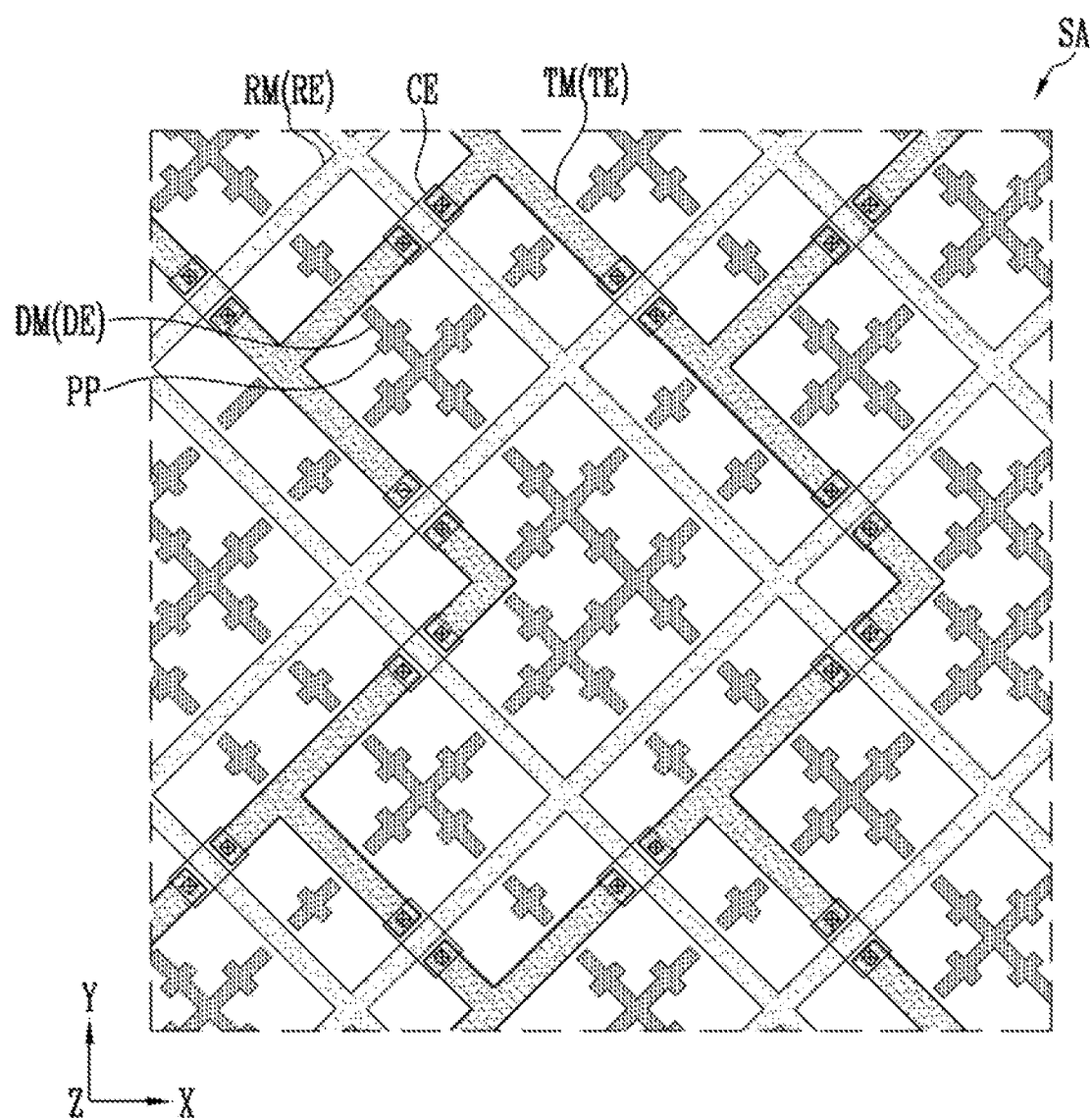

FIG. 7 is an enlarged view illustrating a sensing area in accordance with another embodiment of the inventive concepts.

Figure 8:
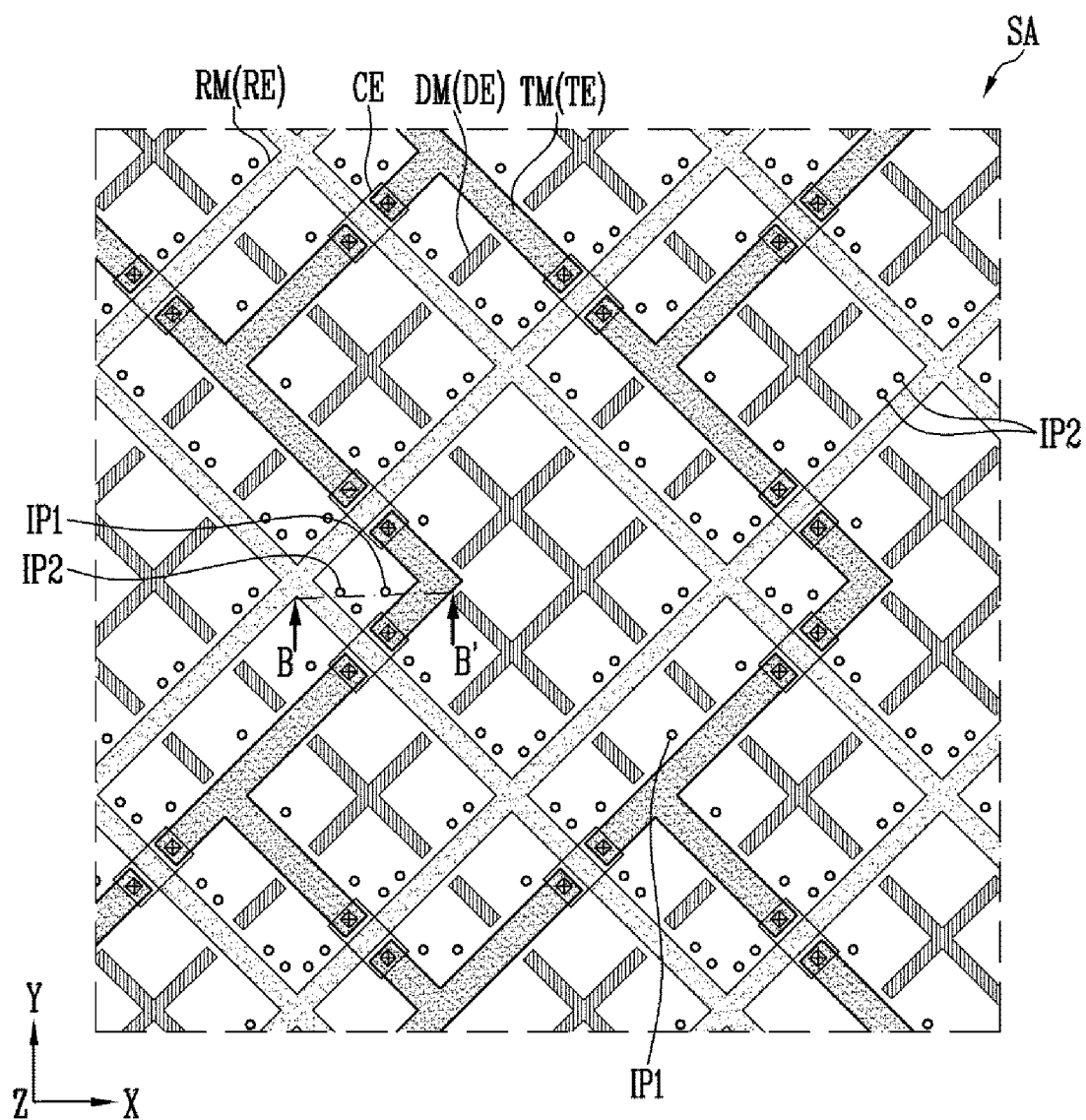

FIG. 8 is an enlarged view illustrating a sensing area in accordance with still another embodiment of the inventive concepts.

Figure 9:
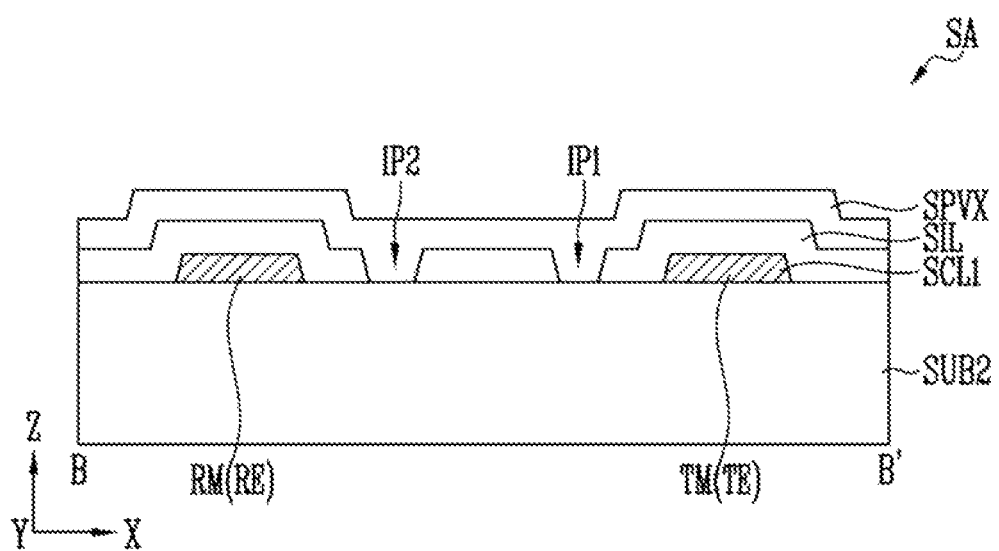

FIG. 9 is a sectional view taken along line B-B' illustrated in FIG. 8.

Figure 10:
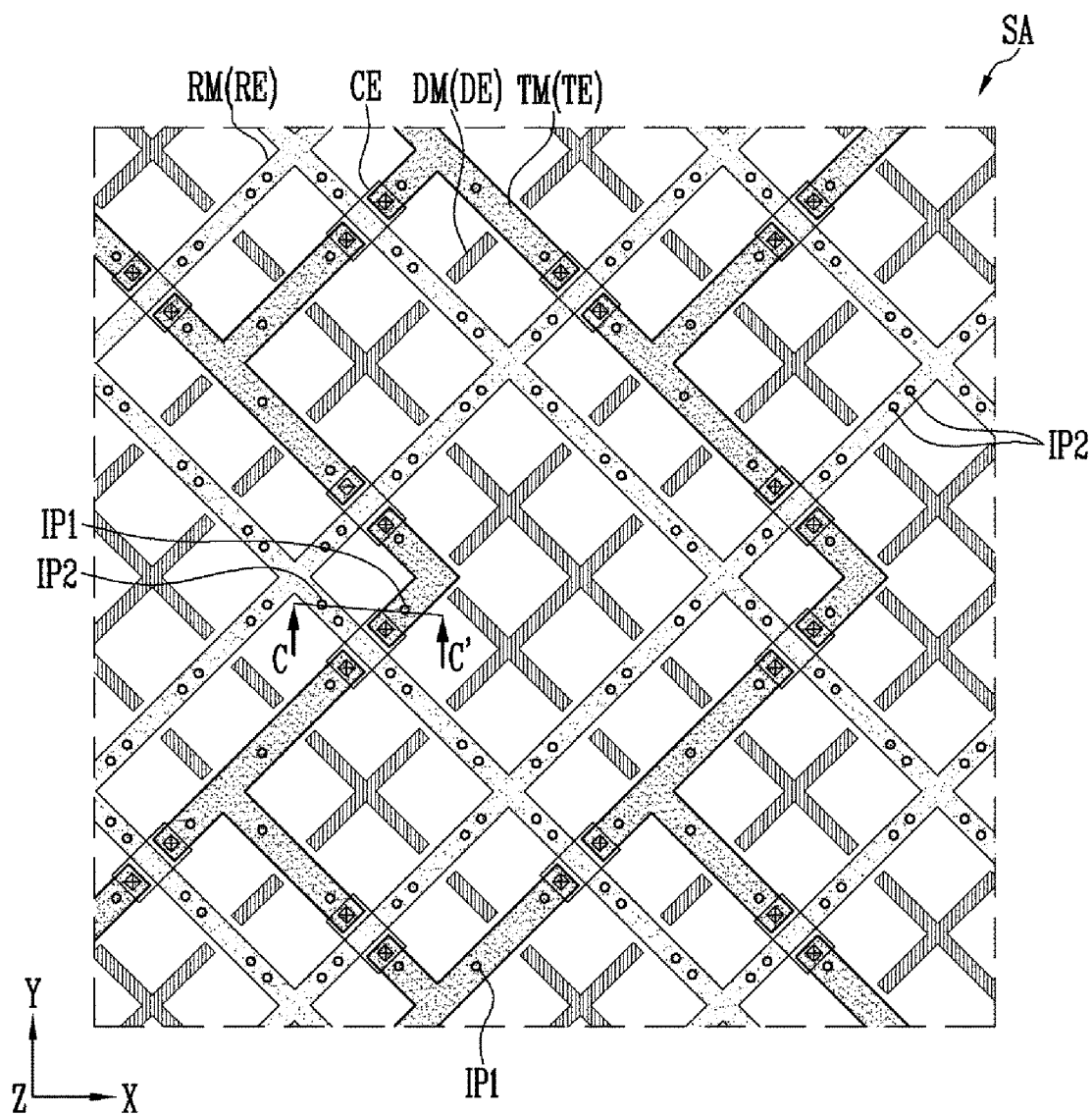
Figure 11:
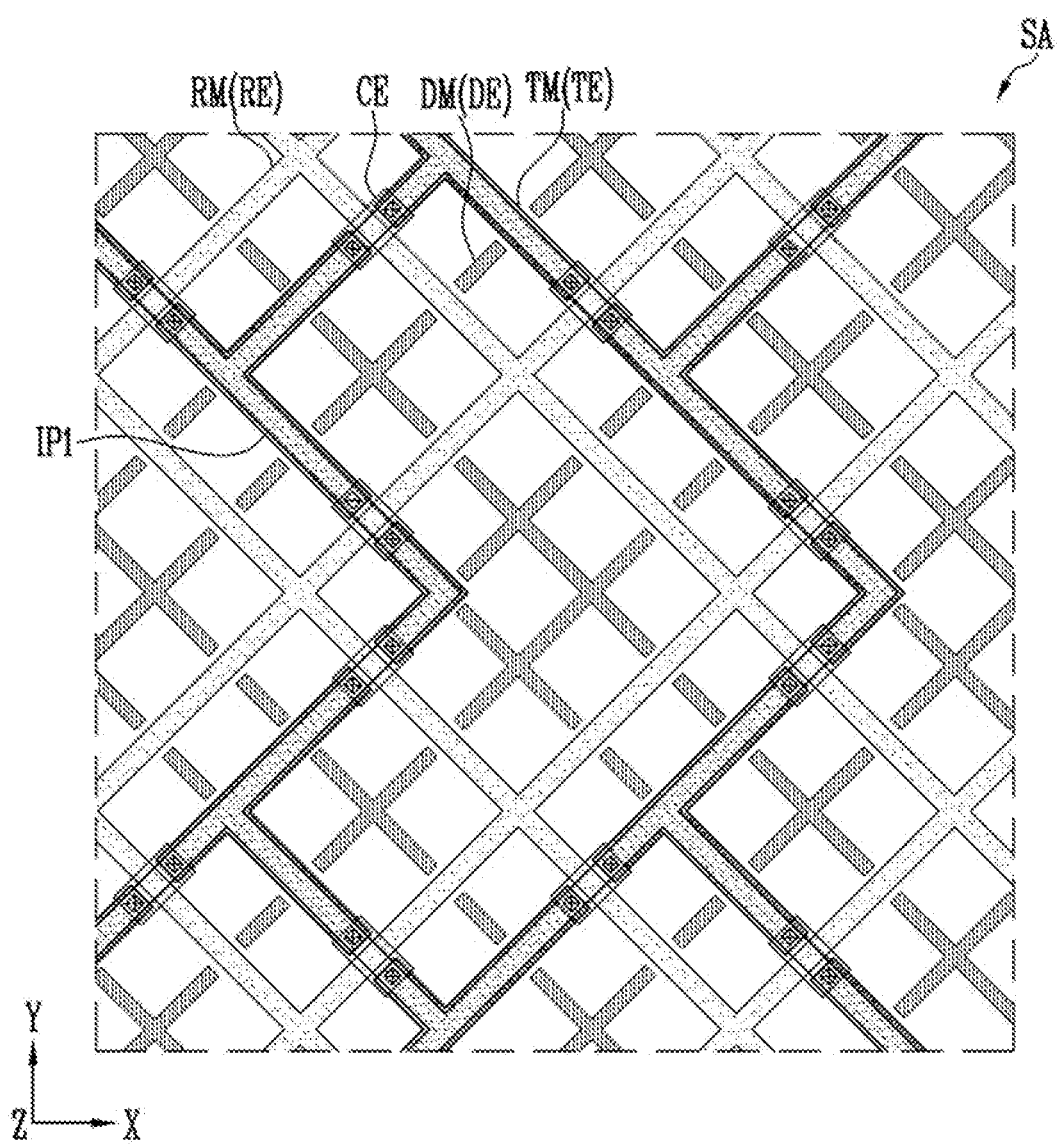

FIGS. 10 and 11 are enlarged views illustrating a sensing area in accordance with still another embodiment of the inventive concepts.

Figure 12:
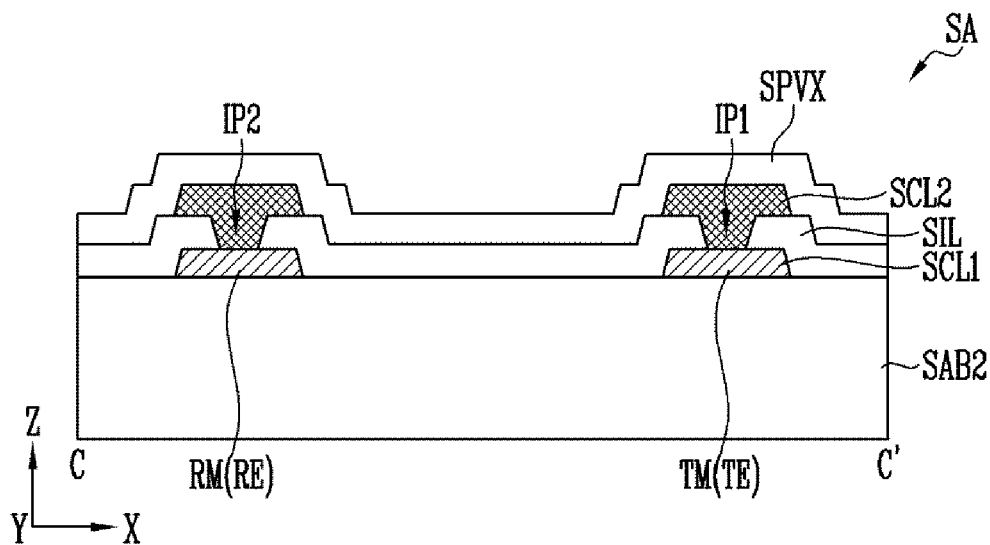
Figure 13:
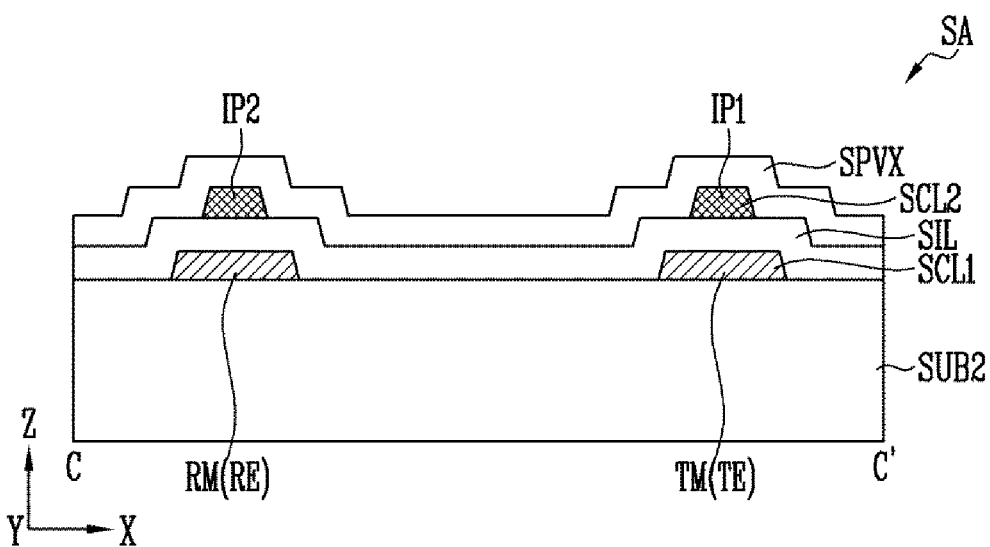

FIGS. 12 and 13 are sectional views taken along line C-C' illustrated in FIG. 10.

Figure 14:
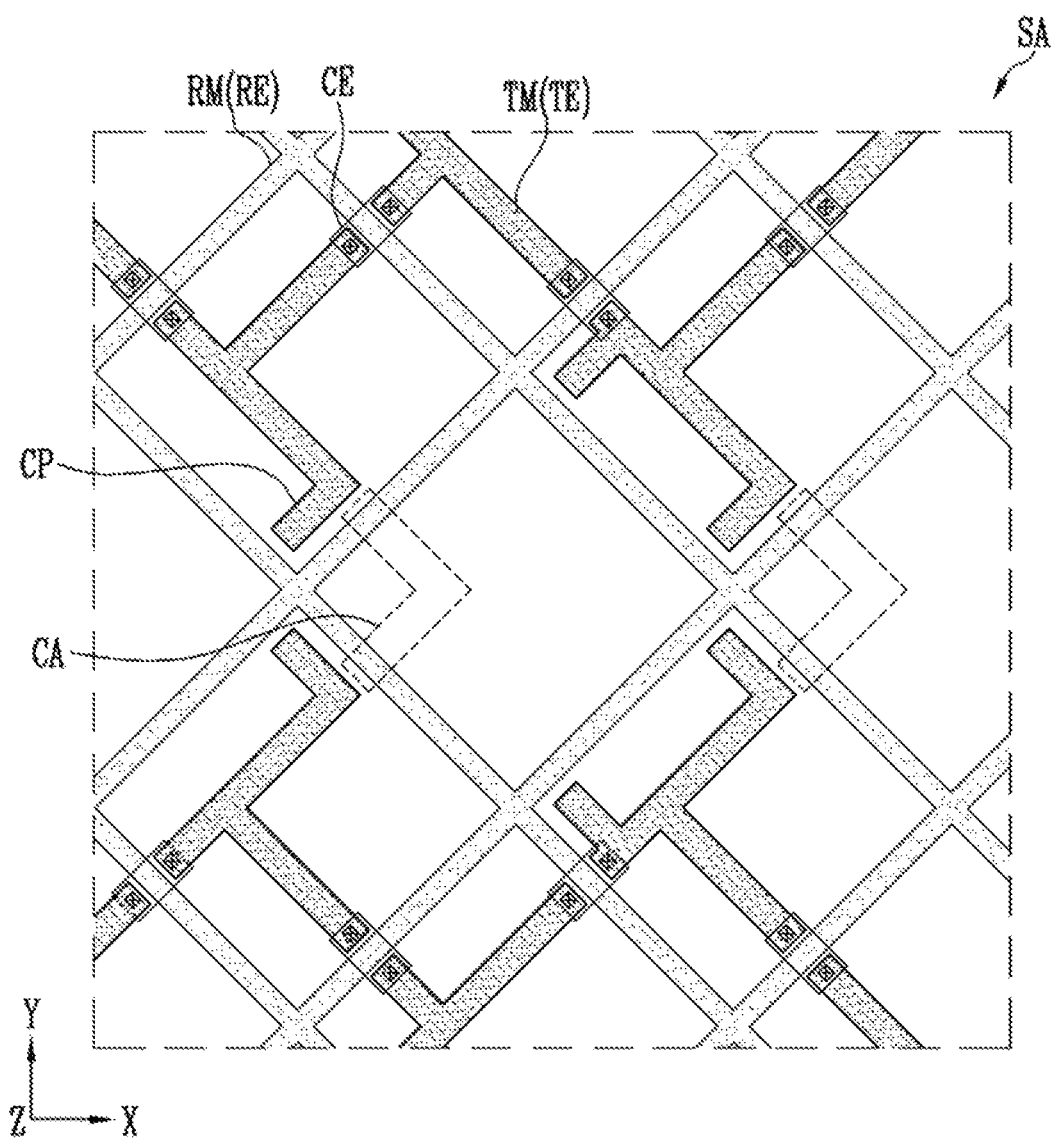

FIG. 14 is an enlarged view illustrating a sensing area in accordance with still another embodiment of the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher" "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The effects and characteristics of the inventive concepts and a method of achieving the effects and characteristics will be clear by referring to the embodiments described below in detail together with the accompanying drawings. However, the inventive concepts are not limited to the embodiments disclosed herein but may be implemented in various forms. The embodiments are provided by way of example only so that a person of ordinary skilled in the art can fully understand the features in the inventive concepts and the scope thereof. Therefore, the inventive concepts can be defined by the scope of the appended claims.

The term "on" that is used to designate that an element or layer is on another element or layer includes both a case where an element or layer is located directly on another element or layer, and a case where an element or layer is located on another element or layer via still another element layer. In the entire description of the inventive concepts, the same drawing reference numerals are used for the same elements across various figures.

Although the terms "first," "second," and the like are used to describe various components, these components are not confined by these terms. These terms are merely used to distinguish one component from the other components. Therefore, a first component may be a second component or vice versa according to the technical concepts of the inventive concepts.

Hereinafter, exemplary embodiments will be described with reference to the accompanying drawings. Throughout the drawings, the same reference numerals are given to the same elements.

FIG. 1 is a sectional view illustrating a display device in accordance with an embodiment of the inventive concepts.

Referring to FIG. 1, the display device 1 is a device configured to display a moving image or still image. The display device 1 may be used as a display screen for not only portable electronic devices such as a mobile phone, a smart phone, a tablet personal computer (PC), a smart watch, a watch phone, a mobile communication terminal, an electronic notebook, an electronic book, a portable multimedia player (PMP), a navigation system, and an ultra-mobile PC but also various products such as a television, a notebook computer, a monitor, an advertising board, and Internet of things (TOT). The display device 1 may be any one of an organic light emitting display device, a liquid crystal display device, a plasma display device, a field emission display device, an electrophoretic display device, an electro-wetting display device, a quantum dot light emitting display device, and a micro LED display device. Hereinafter, a case where the display device 1 is an organic light emitting display device will be mainly described, but the inventive concepts are not limited thereto.

The display device 1 may include a display unit DU, a sensing unit SU, and an adhesive member SEAL through which the display unit DU and the sensing unit SU are adhered to each other.

The display unit DU may include a first substrate SUB1, a thin film transistor layer TFTL, and a light emitting device layer EML.

The first substrate SUB1 may be a rigid substrate or a flexible substrate which is bendable, foldable, rollable, etc. The first substrate SUB1 may be made of an insulating material such as glass, quartz or polymer resin. Examples of the polymer resin may include polyethersulphone (PES), polyacrylate (PA), polyarylate (PAR), polyetherimide (PEI), polyethylene naphthalate (PEN), polyethylene terepthalate (PET), polyphenylene sulfide (PPS), polyallylate, polyimide (PI), polycarbonate (PC), cellulose triacetate (CAT), cellulose acetate propionate (CAP), and combinations thereof. Alternatively, the first substrate SUB1 may include a metallic material.

The thin film transistor layer TFTL may be disposed on the first substrate SUB1. In addition to a thin film transistor of each pixel, a scan line, a data line, a power line, a scan control line, a data connection line connecting a display driving circuit (200 illustrated in FIG. 2) and the data line, a pad connection line connecting the display driving circuit 200 and a display electrode pad, and the like may be disposed in the thin film transistor layer TFTL. Each thin film transistor may include a gate electrode, a semiconductor layer, a source electrode, and a drain electrode. This will be described in detail later.

The light emitting device layer EML may be disposed on the thin film transistor layer TFTL. The light emitting device layer EML may include pixels each in which a first electrode, a light emitting layer, and a second electrode are sequentially stacked to emit light, and a pixel defining layer which defines light emitting areas of the pixels. The pixels of the light emitting device layer EML may be arranged in a display area.

The light emitting layer may be an organic light emitting layer including an organic material. The light emitting layer may include a hole transporting layer, an organic light emitting layer, and an electron transporting layer. When a predetermined voltage is applied to the first electrode and a cathode voltage is applied to the second electrode through the thin film transistor of the thin film transistor layer TFTL, holes and electrons are moved to the organic light emitting layer respectively through the hole transporting layer and the electron transporting layer, and are combined with each other in the organic light emitting layer, thereby emitting light. The first electrode may be an anode electrode, and the second electrode may be a cathode electrode.

The sensing unit SU may include a second substrate SUB2 and a sensing layer SL.

The second substrate SUB2 may be a rigid substrate or a flexible substrate which is bendable, foldable, rollable, etc. The second substrate SUB2 may be made of an insulating material such as glass, quartz or polymer resin. Examples of the polymer resin may include polyethersulphone (PES), polyacrylate (PA), polyarylate (PAR), polyetherimide (PEI), polyethylene naphthalate (PEN), polyethylene terepthalate (PET), polyphenylene sulfide (PPS), polyallylate, polyimide (PI), polycarbonate (PC), cellulose triacetate (CAT), cellulose acetate propionate (CAP), and combinations thereof. Alternatively, the second substrate SUB2 may include a metallic material. The second substrate SUB2 may serve as an encapsulation substrate configured to encapsulate the light emitting device layer EML.

The sensing layer SL may be disposed on the second substrate SUB2. The sensing layer SL may include sensing electrodes configured to sense a touch of a user, sensing electrode pads, and sensing signal lines connecting the sensing electrode pads and the sensing electrodes. The touch of the user may include not only a contact caused by a finger of the user but also a contact caused by a touch pen.

A polarizing film and a cover window may be additionally disposed on the sensing layer SL. The polarizing film may be disposed on the sensing layer SL, and the cover window may be attached onto the polarizing film by a transparent adhesive member.

The adhesive member SEAL may allow the first substrate SUB1 of the display unit DU and the second substrate SUB2 of the sensing unit SU to be adhered to each other. The adhesive member SEAL may be a frit adhesive layer, an ultraviolet curing type resin, or a thermosetting type resin, but the inventive concepts are not limited thereto.

Although a case where a space between the light emitting device layer EML and the second substrate SUB2 is empty is exemplified in FIG. 1, the inventive concepts are not necessarily limited thereto. For example, a filling film may be disposed between the light emitting device layer EML and the second substrate SUB. The filling film may be an epoxy filling film or a silicon filling film.

FIG. 2 is a plan view illustrating the display unit illustrated in FIG. 1.

For convenience of description, only pixels P, scan lines GL, data lines DL, a power line PL, a scan control line SCL, a scan driver 110, the display driving circuit 200, display pads DP, data connection lines DLL, and pad connection lines PLL of the display unit DU are illustrated in FIG. 2.

Referring to FIG. 2, the display unit DU may have a rectangular planar shape having long sides in a first direction (X-axis direction) and short sides in a second direction (Y-axis direction) intersecting the first direction (X-axis direction).

Corners at which the long sides in the first direction (X-axis direction) and the short sides in the second direction (Y-axis direction) may be round to have a predetermined curvature or be at right angles. The planar shape of the display unit DU is not limited to a quadrangular shape, and may have another polygonal shape, a circular shape, or an elliptical shape.

The display unit DU may include a display area DA in which a plurality of pixels P are disposed to display an image and a non-display area NDA which is a peripheral area of the display area DA. The display area NDA may be defined as an area from the outside of the display area DA to an edge of the display unit DA.

The scan lines GL, the data lines DL, the power line PL, and the pixels P may be disposed in the display area DA. The scan lines GL may be disposed in parallel in the first direction (X-axis direction), and the data lines DL may be disposed in parallel in the second direction (Y-axis direction) intersecting the first direction (X-axis direction). The power line PL may include at least one line disposed in parallel to the data lines DL and a plurality of lines branching off in the first direction (X-axis direction) from the at least one line.

Each of the plurality of pixels P may be connected to at least one of the scan lines GL, any one of the data lines DL, and the power line PL. The pixel P may include thin film transistors including a driving transistor and at least one switching transistor, an organic light emitting diode, and a capacitor. The pixel P may be applied with a data voltage of the data line when a scan signal is applied from the scan line GL, and supply a driving current to the organic light emitting diode according to the data voltage applied to a gate electrode, thereby emitting light.

The scan driver 110, the display driving circuit 200, the scan control line SCL, the data connection lines DLL, and the pad connection lines PLL may be disposed in the non-display area NDA.

The scan driver 110 is connected to the display driving circuit 200 through at least one scan control line SCL. The scan driver 110 may receive a scan control signal input from the display driving circuit 200. The scan driver 110 generates a scan signal according to the scan control signal and supplies the scan signal to the scan lines GL.

Although a case where the scan driver 110 is disposed in the non-display area NDA at one outside of the display area DA is exemplified in FIG. 2, the inventive concepts are not limited thereto. For example, the scan driver 110 may be disposed in the non-display area NDA at both outsides of the display area DA.

The display driving circuit 200 is connected to the display pads DP of a display pad area DPA through the pad connection lines PLL to receive digital video data and timing signals. The display driving circuit 200 converts the digital video data into analog positive/negative data voltages and supplies the analog positive/negative data voltages to the data lines DL through the data connection lines DLL. Also, the display driving circuit 200 generates and supplies a scan control signal to control the scan driver 110 through the scan control line SCL. Pixels P to which data voltages are to be supplied may be selected by scan signals of the scan driver 110, and data voltages may be supplied to the selected pixels P. The display driving circuit 200 may be configured with an integrated circuit (IC) to be attached onto a substrate in a chip on glass (COG) method, a chip on plastic (COP) method, or an ultrasonic bonding method.

FIG. 3 is a plan view illustrating the sensing unit illustrated in FIG. 1.

For convenience of description, only first sensing electrodes TE, second sensing electrodes RE, conductive patterns DE, driving routing lines TL1 and TL2, sensing routing lines RL, and sensing pads SP of the sensing unit SU are illustrated in FIG. 3.

Referring to FIG. 3, the sensing unit SU may have a rectangular planar shape having long sides in the first direction (X-axis direction) and short sides in the second direction (Y-axis direction) intersecting the first direction (X-axis direction).

Corners at which the long sides in the first direction (X-axis direction) and the short sides in the second direction (Y-axis direction) may be round to have a predetermined curvature or be at right angles. The planar shape of the sensing unit SU is not limited to a quadrangular shape, and may have another polygonal shape, a circular shape, or an elliptical shape. The planar shape of the sensing unit SU may be similar to that of the display unit DU.

The sensing unit SU includes a sensing area SA configured to sense a touch of a user and a sensing peripheral area NSA disposed at the periphery of the sensing area SA. The sensing area SA may overlap with the display area DA of the display unit DU, and the sensing peripheral area NSA may overlap with the non-display area NDA of the display unit DU.

The first sensing electrodes TE, the second sensing electrodes RE, and the conductive patterns DE may be arranged in the sensing area SA. Hereinafter, a case where the first sensing electrode TE is a driving electrode and the second sensing electrode RE is a sensing electrode will be mainly described.

The first sensing electrodes TE may be disposed in the first direction (X-axis direction) on a plurality of rows, and be electrically connected to each other. The second sensing electrodes RE may be disposed in the second direction (Y-axis direction) on a plurality of columns, and be electrically connected to each other.

The first sensing electrodes TE and the second sensing electrodes RE may be electrically isolated from each other. The first sensing electrodes TE and the second sensing electrodes RE may be disposed to be spaced apart from each other.

The conductive patterns DE may be electrically isolated from the first sensing electrodes TE and the second sensing electrodes RE. That is, the conductive patterns DE may be disposed to be spaced apart from the first sensing electrodes TE and the second sensing electrodes RE. The conductive patterns DE may be disposed to be surrounded by each of the first sensing electrodes TE and the second sensing electrodes RE.

A sensing pad area SPA and a plurality of sensing pads SP provided in the sensing pad area SPA may be disposed in the sensing peripheral area NSA. Although a case where the sensing pad area SPA is disposed at a lower long side of the sensing unit SU is exemplified in FIG. 3, the inventive concepts are not necessarily limited thereto.

The plurality of sensing pads SP may be made of metal oxide having strong corrosion resistance. Accordingly, corrosion of the sensing pads SP can be minimized even when the sensing pads SP are exposed to the outside or when the sensing pads SP pass through a subsequent process such as cleaning. For example, the plurality of sensing pads SP may be made of a transparent metal oxide (TCO) such as indium tin oxide (ITO) or indium zinc oxide (IZO).

The routing lines RL, TL1, and TL2 may extend from the sensing pad area SPA and be disposed up to an edge of the sensing area SA via the sensing peripheral area NSA. One ends of the routing lines RL, TL1, and TL2 may be connected to the sensing pads SP, and the other ends of the routing lines RL, TL1, and TL2 may be connected to the sensing electrodes TE and RE.

The routing lines RL, TL1, and TL2 may include driving routing lines TL1 and TL2 connected to the first sensing electrodes TE and sensing routing lines RL connected to the second sensing electrodes RE. In the embodiment illustrated in FIG. 3, a case where the driving routing lines TL1 and TL2 are driving lines and the sensing routing lines RL are sensing lines will be mainly described.

The driving routing lines TL1 and TL2 may include first driving routing lines TL1 and second driving routing lines TL2.

One ends of the first driving routing lines TL may be connected to one sides of the first sensing electrodes TE. That is, the one ends of the first driving routing lines TL1 may be connected to the first sensing electrodes TE disposed at a first side of the sensing area SA. The first side of the sensing area SA may mean a left short side among the four sides of the sensing area SA.

The other ends of the first driving routing lines TL1 may be connected to some of the sensing pads SP. That is, the first driving routing lines TL1 may function to connect one sides of the first sensing electrodes TE and the sensing pads SP.

One ends of the second driving routing lines TL2 may be connected to the other sides of the first sensing electrodes TE. That is, the one ends of the second driving routing lines TL2 may be connected to the first sensing electrodes TE disposed at a second side of the sensing area SA. The second side of the sensing area SA is the opposite side of the first side, and may mean a right short side among the four sides of the sensing area SA.

The other ends of the second driving routing lines TL2 may be connected to other some of the sensing pads SP of the sensing pad area SPA. That is, the second driving routing lines TL2 may function to connect the other sides of the first sensing electrodes TE and the sensing pads SP.

One ends of the sensing routing lines RL may be connected to one sides of the second sensing electrodes RE. That is, the one ends of the sensing routing lines RL may be connected to the second sensing electrodes disposed at a third side of the sensing area SA. The third side of the sensing area SA is a side disposed between the first side and the second side, and may mean a lower long side among the four sides of the sensing area SA.

The other ends of the sensing routing lines RL may be connected to the others of the sensing pads SP of the sensing pad area SPA. That is, the sensing routing lines RL may function to connect the other sides of the second sensing electrode RE and the sensing pads SP.

FIG. 4 is an enlarged view of the sensing area illustrated in FIG. 3.

Referring to FIG. 4, each of the first sensing electrodes TE, the second sensing electrodes RE, and the conductive patterns DE may have a mesh shape or a net shape.

Specifically, the first sensing electrode TE may include a plurality of first mesh lines TM, the second sensing electrode RE may include a plurality of second mesh lines RM, and the conductive pattern DE may include a plurality of third mesh lines DM.

The first mesh lines TM and the second mesh lines RM may be electrically isolated from each other. The first mesh lines TM and the second mesh lines RM may be disposed to be spaced apart from each other in their intersection areas, to be electrically isolated from each other in the intersection areas. For example, as illustrated in FIG. 4, the first mesh lines TM may be partially disconnected at points adjacent to the second mesh lines RM. One ends of the disconnected first mesh lines TM may be electrically connected by a connection electrode CE. Accordingly, the first mesh lines TM, i.e., the first sensing electrodes TE may be electrically connected to each other in the first direction (X-axis direction), and the second mesh lines RM, i.e., the second sensing electrodes RE may be electrically connected to each other in the second direction (Y-axis direction).

The third mesh lines DM may be electrically isolated from the first mesh lines TM and the second mesh lines RM. The third mesh lines DM may be disposed to be spaced apart from the first mesh lines TM and the second mesh lines RM. That is, the third mesh lines DM may be partially disconnected at points adjacent to the first mesh lines TM and the second mesh line RM.

The first mesh line TM, the second mesh line RM, and/or the third mesh line DM may have different line widths.

Specifically, a line width D1 of the first mesh line TM may be different from that D2 of the second mesh line RM. In addition, a line width D3 of the third mesh line DM may be different from the line width D1 of the first mesh line TM and/or the line width D2 of the second mesh line RM. The line width of each mesh line may mean a width in another direction intersecting one direction in which the mesh line extends.

Although a case where the line width D1 of the first mesh line TM is widest and the line width D3 of the third mesh line DM is narrowest is exemplified in FIG. 4, the inventive concepts are not necessarily limited thereto.

In the sensing unit SU in accordance with the embodiment of the inventive concepts, when the line widths D1, D2, and D3 of the mesh lines TM, RM, and DM are differently designed, the visibility of each of the mesh lines TM, RM, and DM may be changed. Accordingly, the first mesh line TM, the second mesh line RM, and the third mesh line DM, i.e., the first sensing electrode TE, the second sensing electrode RE, and the conductive pattern DE can be easily distinguished from one another, and thus a failure of the sensing unit SU can be effectively analyzed.

FIGS. 5 and 6 are sectional views taken along line A-A' illustrated in FIG. 4.

Referring to FIG. 5, the sensing unit SU may include the second substrate SUB2, a first sensing conductive layer SCL1, a sensing insulating layer SIL, a second sensing conductive layer SCL2, and a sensing protective layer SPVX.

Each of the above-described layers may be provided in a single layer, but be provided in a stacked layer including a plurality of layers. Another layer may be further disposed between the above-described layers.

The first sensing conductive layer SCL1 may be disposed on the second substrate SUB2. The first sensing conductive layer SCL1 may include copper, molybdenum, aluminum, and alloys thereof, which have a low-resistance characteristic. The first sensing conductive layer SCL1 may include the first mesh line TM, the second mesh line RM, and the third mesh line DM, i.e., the first sensing electrode TE, the second sensing electrode RE, and the conductive pattern DE, which are described above. The first sensing electrode TE, the second sensing electrode RE, and the conductive pattern DE may not be viewed by a user. The first mesh line TM, the second mesh line RM, and the third mesh line DM, which constitute the first sensing electrode TE, the second sensing electrode RE, and the conductive pattern DE, may be disposed to overlap with the pixel defining layer which defines the light emitting area of the pixel P (illustrated in FIG. 2) so as to prevent a decrease in opening ratio of the pixel.

The sensing insulating layer SIL may be disposed over the first sensing conductive layer SCL1. The sensing insulating layer SIL insulates the first sensing conductive layer SCL1 and the second sensing conductive layer SCL2 from each other. The sensing insulating layer SIL may include an organic layer and/or an inorganic layer. The organic layer may include, for example, at least one of acryl-based resin, methacryl-based resin, polyisoprene, vinyl-based resin, epoxy-based resin, urethane-based resin, cellulose-based resin, siloxane-based resin, polyimide-based resin, polyamide-based resin, and perylene-based resin. The inorganic layer may include, for example, at least one of aluminum oxide, titanium oxide, silicon oxide, silicon oxynitride, zirconium oxide, and hafnium oxide.

The second sensing conductive layer SCL2 may be disposed on the sensing insulating layer SIL. The second sensing conductive layer SCL2 may include the same material as the first sensing conductive layer SCL1, or include at least one material selected from the materials exemplified as the material constituting the first sensing conductive layer SCL1.

In another embodiment, the second sensing conductive layer SCL2 may be made of the same material as the above-described sensing pads SP. The second sensing conductive layer SCL2 may be simultaneously formed with the sensing pads SP. That is, the second sensing conductive layer SCL2 may be made of a transparent metal oxide (TCO) such as indium tin oxide (ITO) or indium zinc oxide (IZO).

The second sensing conductive layer SCL2 may include the above-described connection electrode CE. One end of the connection electrode CE may be in contact with one end of the first mesh line TM through a contact hole which penetrates the sensing insulating layer SIL and exposes the one end of the first mesh line TM, and the other end of the connection electrode CE may be in contact with the other end of the first mesh line TM through a contact hole which penetrates the sensing insulating layer SIL and exposes the other end of the first mesh line TM. Accordingly, the connection electrode CE may electrically connect adjacent first mesh lines TM, i.e., adjacent first sensing electrodes TE.

The sensing protective layer SPVX may be disposed over the second sensing conductive layer SCL2. The sensing protective layer SPVX may include the same material as the sensing insulating layer SIL, or include at least one material selected from the materials exemplified as the material constituting the sensing insulating layer SIL.

However, the sectional structure of the sensing unit SU is not limited thereto. For example, as illustrated in FIG. 6, the first sensing conductive layer SCL1 may include the connection electrode CE, and the second sensing conductive layer SCL2 may include the first mesh line TM, the second mesh line RM, the third mesh line DM, i.e., the first sensing electrode TE, the second sensing electrode RE, and the conductive pattern DE. One of adjacent first mesh lines TM may be in contact with one end of the connection electrode CE through a contact hole which penetrates the sensing insulating layer SIL and exposes the one end of the connection electrode CE, and another of the adjacent first mesh lines TM may be in contact with the other end of the connection electrode CE through a contact hole which penetrates the sensing insulating layer SIL and exposes the other end of the connection electrode CE. Accordingly, adjacent first mesh lines TM, i.e., adjacent first sensing electrodes TE may be electrically connected to each other by the connection electrode CE.

In accordance with the above-described embodiment, the line widths D1, D2, and D3 of the mesh lines TM, RM, and DM constituting the sensing electrodes TE and RE and the conductive pattern DE are designed to be different from one another, so that the mesh lines TM, RM, and DM can have different visibilities. Accordingly, the first mesh line TM, the second mesh line RM, the third mesh line DM, i.e., the first sensing electrode TE, the second sensing electrode RE, and the conductive pattern DE can be easily distinguished from one another, and thus a failure of the sensing unit SU can be effectively analyzed.

Hereinafter, sensing units in accordance with other embodiments of the inventive concepts will be described. In the following embodiments, components identical to those of the above-described embodiment are designated by like reference numerals, and overlapping descriptions will be omitted or be briefly described.

FIG. 7 is an enlarged view of a sensing area in accordance with another embodiment of the inventive concepts.

Referring to FIG. 7, a sensing unit in accordance with this embodiment is different from the embodiment illustrated in FIGS. 1 to 6, in that at least one of the mesh lines TM, RM, and DM constituting the sensing electrodes TE and RE and the conductive pattern DE includes a protrusion pattern PP.

For convenience of description, a case where the first mesh line TM and the second mesh line RM have different line widths, and the third mesh pattern DM includes a protrusion pattern PP will be mainly described in FIG. 7.

A plurality of protrusion patterns PP may partially protrude from a side of the third mesh line DM. Although a case where the plurality of protrusion patterns PP protrude to both sides from one point of the third mesh line DM is illustrated as an example, the inventive concepts are not limited thereto. For example, the plurality of protrusion patterns PP may protrude to at least one of one side and the other side of the third mesh line DM.

The plurality of protrusion patterns PP may protrude in a direction intersecting that in which the third mesh line DM extends. That is, when the third mesh line DM extends in one direction, the plurality of protrusion patterns PP may protrude in another direction intersecting the one direction.

The plurality of protrusion patterns PP may be arranged at a specific distance. For example, the plurality of protrusion patterns PP may be arranged at the same distance. However, the inventive concepts are not limited thereto, and the distance between the plurality of protrusion patterns PP may be controlled in a range in which visibility for distinguishing the third mesh line DM is ensured.

The plurality of protrusion patterns PP may have a rectangular shape as illustrated in FIG. 7, but the inventive concepts are not necessarily limited thereto. For example, the protrusion pattern PP may have various shapes such as a circular shape and polygonal shape.

Meanwhile, although a case where the third mesh line DM constituting the conductive pattern DE includes the protrusion pattern PP is exemplified in FIG. 7, the inventive concepts are not necessarily limited thereto. For example, a plurality of mesh lines among the first mesh line TM, the second mesh line RM, and the third mesh line DM may include the protrusion pattern PP. The protrusion patterns of the mesh lines are designed to have different sizes, shape, arrangement distances, and the like, so that the mesh lines can have different visibilities.

In accordance with this embodiment, when at least one of the mesh lines includes the protrusion pattern, the mesh lines can have different visibilities. Accordingly, the first mesh line TM, the second mesh line RM, the third mesh line DM, i.e., the first sensing electrode TE, the second sensing electrode RE, and the conductive pattern DE can be easily distinguished from one another, and thus a failure of the sensing unit SU can be effectively analyzed.

FIG. 8 is an enlarged view of a sensing area in accordance with still another embodiment of the inventive concepts. FIG. 9 is a sectional view taken along line B-B' illustrated in FIG. 8.

Referring to FIG. 8, a sensing unit in accordance with this embodiment is different from the embodiment illustrated in FIGS. 1 to 6, in that the sensing unit includes identification patterns IP1 and IP2.

Specifically, a plurality of identification patterns IP1 and IP2 may be disposed adjacent to the sensing electrodes TE and RE and/or the conductive pattern DE, to enable the sensing electrodes TE and RE and/or the conductive pattern DE to be easily identified.

The plurality of identification patterns IP1 and IP2 may include first identification patterns IP1 adjacent to the first sensing electrodes TE and second identification patterns IP2 adjacent to the second sensing electrodes RE. That is, the first identification pattern IP1 may be disposed adjacent to the first mesh line TM, and the second identification pattern IP2 may be disposed adjacent to the second mesh line RM. Degrees to which the identification patterns IP1 and IP2 are respectively adjacent to the mesh lines TM and RM are relative to each other. A distance between the first identification pattern IP1 and the first mesh line TM may be shorter than that between the first identification pattern IP1 and the second mesh line RM, and a distance between the second identification pattern IP2 and the second mesh line RM may be shorter than that between the second identification pattern IP2 and the first mesh line TM.

The first identification pattern IP1 may be disposed at one side of the first mesh line TM, and the second identification pattern IP2 may be disposed at one side of the second mesh line RM. The first identification pattern IP1 may be disposed not to overlap with the first mesh line TM on a plane, and the second identification pattern IP2 may be disposed not to overlap with the second mesh line RM on a plane.

A number of the first identification patterns IP1 may be different from that of the second identification patterns IP2. Although a case where one first identification IP1 is provided and two second identification patters IP2 are provided is exemplified in FIG. 8, numbers of the identification patterns IP1 and IP2 may be controlled in a range in which visibility to distinguish the first mesh line TM and the second mesh line RM from each other is ensured.

Identification patterns of the mesh lines may be identified by their spacing and frequency, or pitch. For example, as illustrated in FIG. 8, first identification patterns IP1 may extend along the first mesh lines TM to identify different segments of the first mesh lines TM. In an embodiment, only a single identification pattern IP1 may be disposed in a section of the first mesh lines TM that are divided by a second mesh line RM or a third mesh line DM, but embodiments are not limited thereto. Although only a single first identification pattern IP1 is illustrated, a plurality of first identification patterns IP1 may be disposed along the first mesh lines TM that are divided by a second mesh line RM or a third mesh line DM.

Also, second identification patterns IP2 may extend along the second mesh lines RM to identify different segments of the second mesh lines RM. In an embodiment, only two identification patterns IP2 may be disposed in a section of the second mesh lines RM that are divided by a first mesh line TM or a third mesh line DM, but embodiments are not limited thereto. Although only two first identification patterns IP1 are illustrated, a larger plurality of or a single second identification pattern IP2 may be disposed along the second mesh lines RM that are divided by the first mesh line TM or a third mesh line DM.

As illustrated in FIG. 8, first identification patterns IP1 and second identification patterns IP2 may be disposed on a same side of a first mesh line TM or second mesh line RM in order to provide uniformity during a manufacturing and during an identification process of each first identification pattern IP1 and second identification pattern IP2.

A memory unit (not illustrated) may be used to store locations of the first identification patterns IP1 and second identification patterns IP2, and thicknesses of the mesh lines. When an error is sensed in one of the sensing areas DE, TE, and RE of the sensing unit SU, locations of the identification patterns may or thicknesses of mesh lines be recognized in order to transmit to a processor (not illustrated) error information regarding a detected region.

Referring to FIG. 9, the first identification pattern IP1 and/or the second identification pattern IP2 may be implemented with a contact hole. That is, the first identification pattern IP1 and/or the second identification pattern IP2 may penetrate the above-described sensing insulating layer SIL. The sensing protective layer SPVX may be in contact with the second substrate SUB2 through the first identification pattern IP1 and/or the second identification pattern IP2.

Meanwhile, although a case where the first identification pattern IP1 and/or the second identification pattern IP2 penetrates the sensing insulating layer SIL in a third direction (Z-axis direction) is exemplified in the drawing, the inventive concepts are not necessarily limited thereto. For example, the first identification pattern IP1 and/or the second identification pattern IP2 may have the shape of a concave groove by partially removing the sensing insulating layer SIL.

Meanwhile, for convenience of description, the first identification pattern IP1 adjacent to the first mesh line TM and the second identification pattern IP2 adjacent to the second mesh line RM are exemplified in FIG. 8, but the inventive concepts are not necessarily limited thereto. For example, the sensing unit may further include a third identification pattern adjacent to the third mesh line DM, or at least one of the first identification pattern IP1 and the second identification pattern IP2 may be omitted.

In accordance with this embodiment, the numbers of the first identification patterns IP1 adjacent to the first mesh line TM and the second identification patterns IP2 adjacent to the second mesh line RM are designed to be different from each other, so that the mesh lines can be easily distinguished from each other. That is, the first sensing electrode TE, the second sensing electrode RE, and/or the conductive pattern DE can be easily distinguished from each other, and thus a failure of the sensing unit can be effectively analyzed.

FIGS. 10 and 11 are enlarged views of a sensing area in accordance with still another embodiment of the inventive concepts. FIGS. 12 and 13 are sectional views taken along line C-C' illustrated in FIG. 10.

Referring to FIGS. 10 and 11, identification patterns IP1 and IP2 in accordance with this embodiment are different from the embodiment illustrated in FIGS. 8 and 9, in that the identification patterns IP1 and IP2 are disposed to overlap with the memory lines TM and RM on a plane, while maintaining the pitch of one first identification pattern IP1 along the first mesh lines TM divided by neighboring lines and two second identification patterns IP2 along second mesh lines RM divided by neighboring lines.

Specifically, as illustrated in FIG. 10, the first identification pattern IP1 may be disposed to partially overlap with the first mesh line TM, and the second identification pattern IP2 may be disposed to partially overlap with the second mesh line RM. A number of the first identification patterns IP1 may be different from that of the second identification patterns IP2. Although a case where one first identification pattern IP1 is provided and two second identification patterns IP2 are provided is exemplified in FIG. 10, numbers of the identification patterns IP1 and IP2 may be controlled in a range in which visibility to distinguish the first mesh line TM and the second mesh line RM from each other is ensured.

Meanwhile, for convenience of description, only the first identification pattern IP1 and/or the second identification pattern IP2 is exemplified in FIG. 11, but the inventive concepts are not necessarily limited thereto. For example, the sensing unit may further include a third identification pattern adjacent to the third mesh line DM, or at least one of the first identification pattern IP1 and the second identification pattern IP2 may be omitted.

Referring to FIG. 12, the first identification pattern IP1 and/or the second identification pattern IP2 may be implemented with a contact hole. That is, the first identification pattern IP1 and/or the second identification pattern IP2 may penetrate the above-described sensing insulating layer SIL. The second sensing conductive layer SCL2 may be in contact with the first sensing conductive layer SCL1 through the first identification pattern IP1 and/or the second identification pattern IP2.

When the first identification pattern IP1 and/or the second identification pattern IP2 is implemented with a contact hole, the first sensing conductive layer SCL1 and the second sensing conductive layer SCL2 may be substantially made of the same material. For example, the first sensing conductive layer SCL1 and the second sensing conductive layer SCL2 may include copper, molybdenum, aluminum, and alloys thereof, which have a low-resistance characteristic. Thus, a reflexibility difference caused by the first identification pattern IP1 and/or the second identification pattern IP2 can be minimized, and simultaneously, the mesh lines can be easily distinguished from each other.

Also, referring to FIG. 13, the first identification pattern IP1 and/or the second identification pattern IP2 may be implemented with a separate conductive pattern. For example, the first identification pattern IP1 and/or the second identification pattern IP2 may be configured with the second sensing conductive layer SCL2. The second sensing conductive layer SCL2 may be made of a material having a reflexibility lower than that of the first sensing conductive layer SCL1. For example, the first sensing conductive layer SCL1 may include copper, molybdenum, aluminum, and alloys thereof, which have a low-resistance characteristic, and the second sensing conductive layer SCL2 may include a transparent metal oxide (TCO) such as indium tin oxide (ITO) or indium zinc oxide (IZO). The identification patterns can be easily recognized by using a reflexibility difference between the sensing conductive layers, and thus the mesh lines can be easily distinguished from each other.

In accordance with this embodiment, the numbers of the first identification patterns IP1 adjacent to the first mesh line TM and the second identification patterns IP2 adjacent to the second mesh line RM are designed to be different from each other, and the identification patterns are formed of a material having a reflexibility different from that of the mesh lines, so that the mesh lines can be easily distinguished from each other. Accordingly, the first sensing electrode TE, the second sensing electrode RE, and/or the conductive pattern DE can be easily distinguished from each other, and thus a failure of the sensing unit can be effectively analyzed.

FIG. 14 is an enlarged view of a sensing area in accordance with still another embodiment of the inventive concepts.

Referring to FIG. 14, a sensing unit in accordance with this embodiment is different from the embodiment illustrated in FIGS. 1 to 6, in that the sensing unit includes a disconnection area CA in which the first sensing electrode TE is disconnected. For convenience of description, illustration of the conductive pattern is omitted in FIG. 14.

Specifically, the first mesh line TM of the first sensing electrode TE may include a disconnection area CA in which the first mesh line TM is partially connected in the second direction (Y-axis direction). The first mesh lines TM may be partially disconnected at points adjacent to the second mesh line RM in the second direction (Y-axis direction). The connection electrode CE connecting one ends of adjacent first mesh lines TM may also not be disposed in the disconnection area CA. Accordingly, the connection electrode CE may not overlap with the second mesh line RM in the disconnection area CA, and thus a point at which the connection electrode CE and the second mesh line RM intersect each other can be minimized. That is, a potential short circuit point between the connection electrode CE and the second mesh line RM can be minimized.

The first mesh line TM may include a plurality of compensation patterns CP protruding from sides thereof. The plurality of compensation patterns CP may protrude in a direction intersecting that in which the first mesh line TM extends. For example, when the first mesh line TM extends in one direction, the plurality of compensation patterns CP may protrude in another direction intersecting the one direction.

The plurality of compensation patterns CP may protrude from one end of the first mesh line TM adjacent to the disconnection area CA. That is, the plurality of compensation patterns CP may have a shape bent from the one end of the first mesh line TM. The plurality of compensation patterns CP may be disposed in parallel to the second mesh line RM. The first mesh line TM includes the plurality of compensation patterns CP disposed in parallel to the second mesh line RM, so that coupling caused by disconnection of the first mesh line TM can be compensated.

In accordance with this embodiment, the first mesh line TM constituting the first sensing electrode TE includes the disconnection area CA in which the first mesh line TM is partially disconnected in the second direction (Y-axis direction), so that a potential short circuit point can be minimized.

Further, the first mesh line TM includes the plurality of compensation pattern disposed in parallel to the second mesh line RM, so that coupling caused by disconnection of the first mesh line TM can be compensated.

In accordance with the present disclosure, mesh lines constituting sensing electrodes can be designed to have different visibilities, or be easily distinguished from each other by using identification patterns. Accordingly, the sensing electrodes can be easily distinguished from each other, and thus a failure of the sensing unit can be effectively analyzed.

Further, the mesh line constituting the sensing electrode includes a disconnection area in which the mesh line is partially disconnected in one direction, so that a partial short circuit point can be minimized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the inventive concepts as set forth in the following claims.

What is claimed is:

1. A sensing unit comprising:
   first sensing electrodes arranged in a sensing area;
   second sensing electrodes electrically isolated from the first sensing electrodes;
   first identification patterns adjacent to the first sensing electrodes; and
   second identification patterns adjacent to the second sensing electrodes,
   wherein a number of the first identification patterns is different from a number of the second identification patterns, and
   wherein at least one of the first identification patterns or the second identification patterns is a contact hole spaced apart from the first sensing electrodes and the second sensing electrodes in a plan view.

2. The sensing unit of claim 1, further comprising:
a substrate;
a first sensing conductive layer disposed on the substrate; and
a sensing insulating layer disposed over the first sensing conductive layer,
wherein the first identification patterns or the second identification patterns penetrate the sensing insulating layer.

3. The sensing unit of claim 2, wherein each of the first sensing electrodes includes a plurality of first mesh lines,
wherein a first identification pattern from among the first identification patterns is disposed at one side of the first mesh lines.

4. The sensing unit of claim 3, further comprising a sensing protective layer disposed on the sensing insulating layer,
wherein the sensing protective layer is in contact with the substrate through the first identification patterns or the second identification patterns.

5. The sensing unit of claim 2, wherein each of the first sensing electrodes includes a plurality of first mesh lines.

6. The sensing unit of claim 5, further comprising a second sensing conductive layer disposed on the sensing insulating layer.

7. A sensing unit comprising:
first sensing electrodes arranged in a sensing area;
second sensing electrodes electrically isolated from the first sensing electrodes;
first identification patterns adjacent to the first sensing electrodes;
second identification patterns adjacent to the second sensing electrodes;
a substrate;
a first sensing conductive layer disposed on the substrate;
a sensing insulating layer disposed over the first sensing conductive layer; and
a second sensing conductive layer disposed on the sensing insulating layer,
wherein a number of the first identification patterns is different from a number of the second identification patterns,
wherein the first identification patterns or the second identification patterns penetrate the sensing insulating layer,
wherein each of the first sensing electrodes includes a plurality of first mesh lines,
wherein the first identification patterns overlap with the first mesh lines on a plane, and
wherein the second sensing conductive layer is in contact with the first sensing conductive layer through the first identification patterns or the second identification patterns.

8. A sensing unit comprising:
first sensing electrodes arranged in a sensing area;
second sensing electrodes electrically isolated from the first sensing electrodes;
first identification patterns adjacent to the first sensing electrodes;
second identification patterns adjacent to the second sensing electrodes;
a first sensing conductive layer;
a second sensing conductive layer above the first sensing conductive layer; and
a sensing insulating layer disposed between the first sensing conductive layer and the second sensing conductive layer,
wherein a number of the first identification patterns is different from a number of the second identification patterns,
wherein the first sensing electrodes and the second sensing electrodes are configured with the first sensing conductive layer, and
wherein the first identification patterns and the second identification patterns are configured with the second sensing conductive layer.

9. The sensing unit of claim 8, wherein each of the first sensing electrodes includes a plurality of first mesh lines,
wherein the first identification patterns overlap with the first mesh lines.

10. The sensing unit of claim 8, wherein a reflexibility of the second sensing conductive layer is lower than a reflexibility of the first sensing conductive layer.

* * * * *